US012767906B2

(12) United States Patent
Iioka et al.

(10) Patent No.: US 12,767,906 B2
(45) Date of Patent: Oct. 20, 2026

(54) AQUEOUS CLEANING LIQUID

(71) Applicant: TOKYO OHKA KOGYO CO., LTD., Kanagawa (JP)

(72) Inventors: Jun Iioka, Kanagawa (JP); Takumi Namiki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 275 days.

(21) Appl. No.: 18/433,995

(22) Filed: Feb. 6, 2024

(65) Prior Publication Data

US 2024/0271062 A1 Aug. 15, 2024

Related U.S. Application Data

(60) Provisional application No. 63/445,302, filed on Feb. 14, 2023.

(51) Int. Cl.

| | |
|---|---|
| ***C11D 7/06*** | (2006.01) |
| ***C11D 3/24*** | (2006.01) |
| ***C11D 3/36*** | (2006.01) |
| ***C11D 7/08*** | (2006.01) |
| ***C11D 7/26*** | (2006.01) |
| ***C11D 7/32*** | (2006.01) |
| ***C11D 7/36*** | (2006.01) |
| ***C11D 17/00*** | (2006.01) |

(52) U.S. Cl.
CPC .............. *C11D 3/245* (2013.01); *C11D 3/361* (2013.01); *C11D 17/0008* (2013.01)

(58) Field of Classification Search
None
See application file for complete search history.

(56) References Cited

U.S. PATENT DOCUMENTS

| | | | | |
|---|---|---|---|---|
| 4,348,367 | A * | 9/1982 | Rickelton | C22B 3/3842 423/139 |
| 5,792,274 | A * | 8/1998 | Tanabe | G03F 7/423 134/40 |
| 8,772,214 | B2 * | 7/2014 | Wu | C11D 3/0073 510/176 |
| 2012/0129345 | A1 * | 5/2012 | Lee | C11D 3/0047 438/692 |
| 2016/0130500 | A1 * | 5/2016 | Chen | C11D 7/06 216/13 |
| 2019/0194580 | A1 | 6/2019 | Kamimura | |
| 2021/0147768 | A1 * | 5/2021 | Oie | C11D 7/10 |
| 2025/0207265 | A1 * | 6/2025 | Oie | C23F 11/1676 |

FOREIGN PATENT DOCUMENTS

| | | |
|---|---|---|
| WO | 2018/061582 A1 | 4/2018 |

* cited by examiner

*Primary Examiner* — Lorna M Douyon
(74) *Attorney, Agent, or Firm* — Rankin, Hill & Clark LLP

(57) ABSTRACT

There is provided an aqueous cleaning liquid containing hydrofluoric acid and a water-soluble aromatic compound, where the aqueous cleaning liquid has a pH of more than 5.

8 Claims, No Drawings

AQUEOUS CLEANING LIQUID

Priority is claimed on U.S. Provisional Application No. 63/445,302, filed on Feb. 14, 2023, the content of which is incorporated herein by reference.

BACKGROUND OF THE INVENTION

Field of the Invention

The present invention relates to an aqueous cleaning liquid.

Description of Related Art

In the process of manufacturing electronic devices such as semiconductor elements, a dry etching step is typically employed in a case of forming a semiconductor integrated circuit. In this dry etching step, dry etching residues (zirconium-based residues, titanium-based residues, polymer residues, and the like) are generated and thus required to be removed. It is preferable that a cleaning agent for removing such dry etching residues does not adversely affect (for example, erosion) a metal material for wiring (such as copper, titanium, cobalt, or tungsten) used for a semiconductor integrated circuit to be cleaned.

For example, Patent Document 1 describes a treatment liquid for a semiconductor device, which contains a fluorine-containing compound and a water-soluble aromatic compound having no heterocyclic group but having a benzene ring, where the treatment liquid has a pH of 5 or less.

PATENT DOCUMENT

[Patent Document 1] PCT International Publication No. WO2018/061582

SUMMARY OF THE INVENTION

There are various metal materials for wiring used in electronic devices and various masking materials used in a case of dry etching, and thus various combinations thereof are present. Therefore, from the viewpoint of an anticorrosion effect on a metal material for wiring, there is a demand for the development of a new cleaning composition.

The present invention has been made in consideration of the above circumstances, and an object of the present invention is to provide an aqueous cleaning liquid having favorable anticorrosion properties.

In order to achieve the above-described object, the present invention employs the following configurations.

(1) An aqueous cleaning liquid containing:

hydrofluoric acid; and a water-soluble aromatic compound, in which the aqueous cleaning liquid has a pH of more than 5.

(2) The aqueous cleaning liquid according to (1), in which the water-soluble aromatic compound does not have a heterocyclic group but has a benzene ring.

(3) The aqueous cleaning liquid according to (1) or (2), in which the water-soluble aromatic compound includes at least one kind of compound selected from the group consisting of a phenylphosphonic acid compound, a diphenyl phosphonate compound, a diphenylphosphinic acid compound, a benzenecarboxylic acid compound, a benzenesulfonic acid compound, and a phenol compound.

(4) The aqueous cleaning liquid according to any one of (1) to (3), in which 1% by mass or less of the water-soluble aromatic compound is contained with respect to a total amount of the aqueous cleaning liquid.

(5) The aqueous cleaning liquid according to (3), in which the aqueous cleaning liquid contains two or more kinds of the water-soluble aromatic compounds.

(6) The aqueous cleaning liquid according to (5), in which a first water-soluble aromatic compound includes a phenylphosphonic acid compound, and a second water-soluble aromatic compound includes at least one kind of compound selected from the group consisting of a diphenyl phosphonate compound and a diphenylphosphinic acid compound.

(7) The aqueous cleaning liquid according to (6), in which a mass ratio of the first water-soluble aromatic compound to the second water-soluble aromatic compound is in a range of the first water-soluble aromatic compound:the second water-soluble aromatic compound=100:0.01 to 100:30.

(8) The aqueous cleaning liquid according to any one of (1) to (7), in which 50 ppm or more and 3,000 ppm or less of the hydrofluoric acid is contained with respect to a total amount of the aqueous cleaning liquid.

(9) The aqueous cleaning liquid according to any one of (1) to (8), in which the aqueous cleaning liquid has a pH in a range of more than 5 to 7.

According to the present invention, it is possible to provide an aqueous cleaning liquid having favorable anticorrosion properties.

DETAILED DESCRIPTION OF THE INVENTION (Cleaning Liquid)

An aqueous cleaning liquid according to a first aspect of the present invention contains hydrofluoric acid and a water-soluble aromatic compound.

The content of each component in the aqueous cleaning liquid denotes the concentration of the component in a case of using the liquid for cleaning an electronic device. Each component may be prepared at the concentration in advance, or a concentrated product in a distribution and supply form may be diluted to the concentration in a case of using the liquid for cleaning an electronic device.

<Hydrofluoric Acid>

In the present embodiment, the content of the hydrofluoric acid is not particularly limited; however, it is preferably 50 ppm or more, more preferably 100 ppm or more, and still more preferably 300 ppm or more with respect to the total amount of the aqueous cleaning liquid.

The upper limit thereof is not particularly limited, and is, for example, 3,000 ppm or less and preferably 2,000 ppm or less in a case of being used for the cleaning liquid.

In a case where the content of hydrofluoric acid is in the above-described preferred range, the cleanability is likely to be made favorable.

It is sufficient to adjust the mass ratio of hydrofluoric acid to the following water-soluble aromatic compound in a range of 0.001 to 10 in a case where the water-soluble aromatic compound is set to 1. The mass ratio is preferably in a range of 0.01 to 5, and it is more preferably in a range of 0.1 to 1.0 from the viewpoint of anticorrosion properties.

<Water-Soluble Aromatic Compound>

In the present embodiment, the water-soluble aromatic compound refers to an aromatic compound that has a solubility of 0.001 g/L or more in water (25° C.) (preferably 0.1 g/L or more, more preferably 1 g/L or more, and still more preferably 10 g/L or more).

It is preferable that the water-soluble aromatic compound does not have a heterocyclic group but has a benzene ring.

It is preferable that the water-soluble aromatic compound includes at least one kind of compound selected from the group consisting of a phenylphosphonic acid compound, a diphenyl phosphonate compound, a diphenylphosphinic acid compound, a benzenecarboxylic acid compound, a benzenesulfonic acid compound, and a phenol compound.

Examples of the phenylphosphonic acid compound include phenylphosphonic acid and carboxyphenylphosphonic acid.

Examples of the diphenyl phosphonate compound include diphenyl phosphonate, (2-methylphenyl)phenylphosphinic acid, (4-ethylphenyl)phenylphosphinic acid, 4-(phenylphosphinyl)benzenethiol, 4-(phenylphosphinyl)phenol, 4-(phenylphosphinyl)aminobenzene, and 4-(phenylphosphinyl) benzaldehyde.

Examples of the diphenylphosphinic acid compound include diphenylphosphinic acid, P-(2-methylphenyl)-P-phenylphosphinic acid, (4-hydroxyphenyl)phenylphosphinic acid, P-bis(4-hydroxyphenyl)phosphinic acid, P-(4-aminophenyl)-P-phenylphosphinic acid, P,P-bis(4-mercaptophenyl)phosphinic acid, and 4-(hydroxyphenylphosphinyl)benzoic acid.

Examples of the benzenecarboxylic acid compound include benzoic acid, salicylic acid, phthalic acid, anthranilic acid, and dihydroxybenzoic acid. Among these, salicylic acid or phthalic acid is preferable, and phthalic acid is more preferable.

Examples of the benzenesulfonic acid compound include benzenesulfonic acid and p-toluenesulfonic acid. Among these, p-toluenesulfonic acid is preferable.

The aqueous cleaning liquid according to the present embodiment preferably contains two or more kinds of the water-soluble aromatic compounds. In a case where the aqueous cleaning liquid according to the present embodiment contains two or more kinds of the water-soluble aromatic compounds, from the viewpoint of anticorrosion properties, it is preferable that a first water-soluble aromatic compound includes a phenylphosphonic acid compound, and a second water-soluble aromatic compound includes at least one kind of compound selected from the group consisting of a diphenyl phosphonate compound and a diphenylphosphinic acid compound.

In a case where the aqueous cleaning liquid according to the present embodiment contains the first water-soluble aromatic compound and the second water-soluble aromatic compound, the mass ratio of the first water-soluble aromatic compound to the second water-soluble aromatic compound is preferably in a range of the first water-soluble aromatic compound:the second water-soluble aromatic compound=100:0.001 to 100:100, and it is more preferably in a range of 100:0.01 to 100:30.

In a case where the mass ratio of the first water-soluble aromatic compound to the second water-soluble aromatic compound is within the above-described preferred range, anticorrosion properties are easily improved while maintaining cleanability.

In the present embodiment, the content of the water-soluble aromatic compound is not particularly limited; however, it is preferably 1% by mass or less, more preferably in a range of 0.01% to 1% by mass, and still more preferably in a range of 0.1% to 1.0% by mass with respect to the total amount of the aqueous cleaning liquid.

In a case where the content of the water-soluble aromatic compound is within the above-described preferred range, the anticorrosion properties are likely to be made favorable while maintaining the cleanability.

<Water>

The aqueous cleaning liquid according to the present embodiment contains water as a diluent. In the present embodiment, water is not particularly limited, but water obtained by carrying out distillation, an ion exchange treatment, a filter treatment, various adsorption treatments, and the like to remove metal ions, organic impurities, particles, and the like is preferable, and pure water or ultrapure water is particularly preferable.

The content of water is typically in a range of 40% to 99.9998% by mass and preferably in a range of 89.5% to 99.998% by mass with respect to the total amount of the aqueous cleaning liquid.

The aqueous cleaning liquid according to the present embodiment may contain optional components in addition to the hydrofluoric acid and the water-soluble aromatic compound. Examples of the optional components include an acid other than the hydrofluoric acid and the water-soluble aromatic compound, an anticorrosion agent, a surfactant, a pH adjusting agent, a buffer, and an organic solvent.

The other acid may be an inorganic acid or may be an organic acid.

Examples of the inorganic acid include nitric acid, sulfuric acid, hydrochloric acid, and phosphoric acid.

Examples of the organic acid include an aliphatic carboxylic acid having 1 to 18 carbon atoms, an aromatic carboxylic acid having 6 to 10 carbon atoms, and an amino acid having 1 to 10 carbon atoms.

Preferred examples of the aliphatic carboxylic acid having 1 to 18 carbon atoms include formic acid, acetic acid, propionic acid, lactic acid, glycolic acid, diglycolic acid, pyruvic acid, malonic acid, butyric acid, hydroxybutyric acid, tartaric acid, succinic acid, malic acid, maleic acid, fumaric acid, valeric acid, glutaric acid, itaconic acid, adipic acid, caproic acid, adipic acid, citric acid, propanetricarboxylic acid, trans-aconitic acid, enantoic acid, caprylic acid, lauric acid, myristic acid, palmitic acid, stearic acid, oleic acid, linoleic acid, and linolenic acid.

Preferred examples of the amino acid having 1 to 10 carbon atoms include carbamic acid, alanine, glycine, asparagine, aspartic acid, sarcosine, serine, glutamine, glutamic acid, 4-aminobutyric acid, iminodibutyric acid, arginine, leucine, isoleucine, and nitrilotriacetic acid.

In a case where the aqueous cleaning liquid according to the present embodiment contains another acid, the content of the other acid is preferably in a range of 0.0001% to 50% by mass, more preferably in a range of 0.0005% to 20% by mass, and still more preferably in a range of 0.001% to 10% by mass with respect to the total amount of the aqueous cleaning liquid.

The aqueous cleaning liquid according to the present embodiment may not contain the other acid and may not contain one or more kinds of the compounds described as the specific examples of the other acid.

<<Anticorrosion Agent>>

The aqueous cleaning liquid according to the present embodiment may contain an anticorrosion agent.

Examples of the anticorrosion agent include a compound containing a nitrogen-containing heterocyclic ring such as a triazole ring, an imidazole ring, a pyridine ring, a phenanthroline ring, a tetrazole ring, a pyrazole ring, a pyrimidine ring, or a purine ring.

Examples of the compound containing a triazole ring include triazoles such as 1,2,3-triazole, 1,2,4-triazole, 3-amino-1H-1,2,4-triazole, 1-acetyl-1H-1,2,3-triazolo[4,5-b]pyridine, 1H-1,2,3-triazolo[4,5-b]pyridine, 1,2,4-triazolo[4,3-a]pyridin-3(2H)-one, and 3H-1,2,3-triazolo[4,5-b]pyridin-3-ol; and benzotriazoles such as 1,2,3-benzotriazole, 5-methyl-1H-benzotriazole, 1-hydroxybenzotriazole, 1-dihydroxypropylbenzotriazole, 2,3-dicarboxypropylbenzotriazole, 4-hydroxybenzotriazole, 4-carboxyl-1H-benzotriazole, 4-carboxyl-1H-benzotriazole methyl ester, 4-carboxyl-1H-benzotriazole butyl ester, 4-carboxyl-1H-benzotriazole octyl ester, 5-hexylbenzotriazole, [1,2,3-benzotriazolyl-1-methyl][1,2,4-triazolyl-1-methyl][2-ethylhexyl]amine, tolyltriazole, naphthotriazole, bis[(1-benzotriazolyl)methyl] phosphonic acid, and 3-aminotriazole.

Examples of the compound containing an imidazole ring include imidazoles such as 2-methylimidazole, 2-ethylimidazole, 2-isopropylimidazole, 2-propylimidazole, 2-butylimidazole, 4-methylimidazole, 2,4-dimethylimidazole, 2-ethyl-4-methylimidazole, 2-undecylimidazole, 2-aminoimidazole, and benzimidazole; and biimidazoles such as 2,2'-biimidazole. Among those, biimidazoles are preferable, and 2,2'-biimidazole is more preferable.

Examples of the compound containing a pyridine ring include pyridines such as 1H-1,2,3-triazolo[4,5-b]pyridine, 1-acetyl-1H-1,2,3-triazolo[4,5-b]pyridine, 3-aminopyridine, 4-aminopyridine, 3-hydroxypyridine, 4-hydroxypyridine, 2-acetamidopyridine, 4-pyrrolidinopyridine, 2-cyanopyridine, 2,6-pyridinecarboxylic acid, and 2,4,6-trimethylpyridine; and bipyridyls such as 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl. Among those, bipyridyls are preferable, and 2,2'-bipyridyl, 4,4'-dimethyl-2,2'-bipyridyl, 4,4'-di-tert-butyl-2,2'-bipyridyl, 4,4-dinonyl-2,2-bipyridyl, 2,2"-bipyridine-6,6'-dicarboxylic acid, and 4,4'-dimethoxy-2,2'-bipyridyl are more preferable.

Examples of the compound containing a phenanthroline ring include 1,10-phenanthroline.

Examples of the compound containing a tetrazole ring include 1H-tetrazole, 5-amino-1H-tetrazole, 5-methyl-1H-tetrazole, 5-phenyl-1H-tetrazole, and 1-(2-diaminoethyl)-5-mercaptotetrazole.

Examples of the compound containing a pyrazole ring include 3,5-dimethylpyrazole, 3-amino-5-methylpyrazole, 4-methylpyrazole, and 3-amino-5-hydroxypyrazole.

Examples of the compound containing a pyrimidine ring include pyrimidine, 4-methylpyrimidine, 1,2,4-triazolo[1,5-a]pyrimidine, 1,3,4,6,7,8-hexahydro-2H-pyrimido[1,2-a]pyrimidine, 1,3-diphenyl-pyrimidine-2,4,6-trione, 1,4,5,6-tetrahydropyrimidine, 2,4,5,6-tetraaminopyrimidinesulfate, 2,4,5-trihydroxypyrimidine, 2,4,6-triaminopyrimidine, 2,4,6-trichloropyrimidine, 2,4,6-trimethoxypyrimidine, 2,4,6-triphenylpyrimidine, 2,4-diamino-6-hydroxypyrimidine, 2,4-diaminopyrimidine, 2-acetamidopyrimidine, 2-aminopyrimidine, 2-methyl-5,7-diphenyl-(1,2,4)triazolo(1,5-a)pyrimidine, 2-methylsulfanyl-5,7-diphenyl-(1,2,4)triazolo(1,5-a)pyrimidine, 2-methylsulfanyl-5,7-diphenyl-4,7-dihydro-(1,2,4)triazolo(1,5-a)pyrimidine, and 4-aminopyrazolo[3,4-d]pyrimidine.

Examples of the compound containing a purine ring include adenine, guanine, hypoxanthine, xanthine, uric acid, and theophylline.

One kind of the anticorrosion agent may be used alone, or two or more kinds thereof may be used in combination.

In a case where the aqueous cleaning liquid according to the present embodiment contains an anticorrosion agent, the content of the anticorrosion agent is not particularly limited; however, it is preferably in a range of 0.0001% to 1.0% by mass (1 to 10,000 ppm), more preferably in a range of 0.001% to 0.7% by mass (10 to 7,000 ppm), still more preferably in a range of 0.005% to 0.5% by mass (50 to 5,000 ppm), and particularly preferably in a range of 0.01% to 0.3% by mass (100 to 3,000 ppm) with respect to the total mass of the aqueous cleaning liquid.

The aqueous cleaning liquid of the present embodiment may not contain one or more kinds of compounds selected from the group consisting of a compound containing a triazole ring, a compound containing an imidazole ring, a compound containing a pyridine ring, a compound containing a phenanthroline ring, a compound containing a tetrazole ring, a compound containing a pyrazole ring, a compound containing a pyrimidine ring, and a compound containing a purine ring, and it may not contain one or more kinds of the compounds described as the specific examples of the anticorrosion agent. The aqueous cleaning liquid according to the present embodiment may not contain the anticorrosion agent.

<<Surfactant>>

The aqueous cleaning liquid according to the present embodiment may contain a surfactant for the intended purpose of preventing foaming and adjusting the wettability of the cleaning liquid to a substrate. Examples of the surfactant include a nonionic surfactant, an anionic surfactant, a cationic surfactant, and an amphoteric surfactant.

Examples of the nonionic surfactant include a polyalkylene oxide alkyl phenyl ether-based surfactant, a polyalkylene oxide alkyl ether-based surfactant, a block polymer-based surfactant consisting of polyethylene oxide and polypropylene oxide, a polyoxyalkylene distyrenated phenyl ether-based surfactant, a polyalkylene tribenzyl phenyl ether-based surfactant, and an acetylene polyalkylene oxide-based surfactant.

Examples of the anionic surfactant include an alkylsulfonic acid, an alkylbenzenesulfonic acid, an alkylnaphthalenesulfonic acid, an alkyldiphenyl ether sulfonic acid, a fatty acid amidosulfonic acid, a polyoxyethylene alkyl ether carboxylic acid, a polyoxyethylene alkyl ether acetic acid, a polyoxyethylene alkyl ether propionic acid, an alkyl phosphonic acid, and a fatty acid salt. Examples of "salt" include an ammonium salt, a sodium salt, a potassium salt, and a tetramethylammonium salt.

Examples of the cationic surfactant include an alkylpyridium-based surfactant.

Examples of the amphoteric surfactant include a betaine type surfactant, an amino acid type surfactant, an imidazoline type surfactant, and an amine oxide type surfactant.

These surfactants are generally commercially available. One kind of the surfactant may be used alone, or two or more kinds thereof may be used in combination.

In a case where the aqueous cleaning liquid according to the present embodiment contains a surfactant, the content of the surfactant is not particularly limited; however, it is, for example, preferably in a range of 0.0001% to 5% by mass, more preferably in a range of 0.001% to 3% by mass, still more preferably in a range of 0.002% to 1% by mass, and particularly preferably in a range of 0.002% to 0.2% by mass with respect to the total mass of the aqueous cleaning liquid. In a case where the content of the surfactant is in the above-described preferred range, bubbles that are generated by the foaming agent are likely to be dense.

The aqueous cleaning liquid according to the present embodiment may not contain one or more kinds of surfactants selected from the group consisting of a nonionic surfactant, an anionic surfactant, a cationic surfactant, and an amphoteric surfactant, and it may not contain one or more kinds of the compounds described as the examples of these surfactants. The aqueous cleaning liquid according to the present embodiment may not contain a surfactant.

<<pH Adjusting Agent>>

The aqueous cleaning liquid according to the present embodiment may contain a pH adjusting agent other than the acid component in a range where the effect of the present invention is not impaired. Examples of the pH adjusting agent include a basic compound. The basic compound may be an organic basic compound or may be an inorganic basic compound.

Examples of the inorganic basic compound include an inorganic compound containing an alkali metal or an alkaline earth metal and a salt thereof. Examples thereof include ammonium hydroxide, lithium hydroxide, sodium hydroxide, potassium hydroxide, rubidium hydroxide, and cesium hydroxide.

Examples of the organic basic compound include a quaternary ammonium salt and an alkylamine (such as trimethylamine or triethylamine). Examples of the quaternary ammonium salt include tetramethylammonium hydroxide (TMAH), bis(2-hydroxyethyl)dimethylammonium hydroxide, tetraethylammonium hydroxide (TEAH), tetrapropylammonium hydroxide, tetrabutylammonium hydroxide, methyltriethylammonium hydroxide, trimethyl(hydroxyethyl)ammonium hydroxide, and triethyl(hydroxyethyl)ammonium hydroxide.

One kind of the pH adjusting agent may be used alone, or two or more kinds thereof may be used in combination.

The aqueous cleaning liquid according to the present embodiment may not contain a pH adjusting agent other than the acid component and may not contain one or more kinds of the pH adjusting agents described as the examples thereof.

<<Buffer>>

The aqueous cleaning liquid according to the present embodiment may contain a buffer. The buffer is a compound having an action of suppressing a change in the pH of a solution.

The buffer is not particularly limited as long as it is a compound having a pH buffering ability. As the buffer, for example, a compound having a pKa of 6 to 11 can be used.

Examples of the buffer include a Good's buffer. Example of the Good's buffer include 2-cyclohexylaminoethanesulfonic acid (CHES), 3-cyclohexylaminopropanesulfonic acid (CAPS), N-tris(hydroxymethyl)methyl-3-aminopropanesulfonic acid (TAPS), 4-(cyclohexylamino)-1-butanesulfonic acid (CABS), tricine, bicine, 2-morpholinoethanesulfonic acid monohydrate (MES), bis(2-hydroxyethyl)aminotris(hydroxymethyl)methane (Bis-Tris), N-(2-acetamido)iminodiacetic acid (ADA), piperazine-1,4-bis(2-ethanesulfonic acid) (PIPES), N-(2-acetamido)-2-aminoethanesulfonic acid (ACES), 2-hydroxy-3-morpholinopropanesulfonic acid (MOPSO), N,N-bis(2-hydroxyethyl)-2-aminoethanesulfonic acid (BES), 3-morpholinopropanesulfonic acid (MOPS), N-tris(hydroxymethyl)methyl-2-aminoethanesulfonic acid (TES), 2-[4-(2-hydroxyethyl)-1-piperazinyl]ethanesulfonic acid (HEPES), 3-[N-tris(hydroxymethyl)methylamino]-2-hydroxypropanesulfonic acid (TAPSO), piperazine-1,4-bis(2-hydroxypropanesulfonic acid) (POPSO), 4-(2-hydroxyethyl)piperazine-1-(2-hydroxypropane-3-sulfonic acid) (HEPSO), and 4-(2-hydroxyethyl)-1-piperazinepropanesulfonic acid (EPPS).

One kind of the buffer may be used alone, or two or more kinds thereof may be used in combination.

In a case where the aqueous cleaning liquid according to the present embodiment contains a buffer, the content of the buffer is not particularly limited. However, it may be in a range of 0.001% by mass to 10% by mass, and it is preferably in a range of 0.005% by mass to 5% by mass, more preferably in a range of 0.01% by mass to 1% by mass, and particularly preferably in a range of 0.05% by mass to 0.5% by mass or in a range of 0.05% by mass to 0.3% by mass with respect to the total mass of the aqueous cleaning liquid.

The aqueous cleaning liquid according to the present embodiment may not contain a buffer and may not contain one or more kinds of the compounds described as the specific examples of the buffer.

<<Organic Solvent>>

The aqueous cleaning liquid according to the present embodiment may contain an organic solvent in a range where the effect of the present invention is not impaired. The organic solvent is preferably a water-soluble organic solvent. Examples of the water-soluble organic solvent include alcohols (for example, isopropanol, ethanol, ethylene glycol, propylene glycol, glycerin, 1,3-propanediol, 1,3-butanediol, 1,4-butanediol, diethylene glycol, dipropylene glycol, furfuryl alcohol, and 2-methyl-2,4-pentanediol), dimethyl sulfoxide, and ethers (for example, ethylene glycol dimethyl ether, diethylene glycol dimethyl ether, triethylene glycol dimethyl ether, tetraethylene glycol dimethyl ether, and propylene glycol dimethyl ether).

One kind of the water-soluble organic solvent may be used alone, or two or more kinds thereof may be used in combination.

In a case where the aqueous cleaning liquid according to the present embodiment contains a water-soluble organic solvent, the content of the water-soluble organic solvent is preferably 50% by mass or less, more preferably 30% by mass or less, and still more preferably 20% by mass or less with respect to the total amount of water and the water-soluble organic solvent.

The aqueous cleaning liquid according to the present embodiment may not contain an organic solvent or a water-soluble organic solvent and may not contain one or more kinds of the compounds described as the specific examples of the water-soluble organic solvent.

<<Impurities and Like>>

The aqueous cleaning liquid according to the present embodiment may contain metal impurities containing a metal atom such as a Fe atom, a Cr atom, a Ni atom, a Zn atom, a Ca atom, or a Pb atom. The total content of the metal atoms in the aqueous cleaning liquid according to the present embodiment is preferably 100 ppt by mass or less with respect to the total mass of the aqueous cleaning liquid. The lower limit value of the total content of the metal atoms is preferably as low as possible; however, examples thereof include 0.001 ppt by mass or more. Examples of the total content of the metal atoms include 0.001 ppt by mass to 100 ppt by mass. In a case of setting the total content of the metal atoms to be equal to or smaller than the preferred upper limit value, the defect suppressibility and the residue suppressibility of the cleaning liquid are improved. It is conceived that in a case where the total content of the metal atoms is set to be equal to or larger than the preferred lower limit value, the metal atoms are less likely to be released to be present in the system and less likely to adversely affect a production yield of the entire object to be cleaned.

The content of the metal impurities can be adjusted by, for example, a purification treatment such as filtering. The purification treatment such as filtering may be carried out on a part or the whole raw material before the preparation of the cleaning liquid or may be carried out after the preparation of the aqueous cleaning liquid.

The aqueous cleaning liquid according to the present embodiment may contain, for example, impurities derived from an organic substance (organic impurities). The total content of the organic impurities in the aqueous cleaning liquid according to the present embodiment is preferably 5,000 ppm by mass or less. The lower limit of the content of the organic impurities is preferably as low as possible; however, examples thereof include 1 ppq by mass or more. The total content of the organic impurities is, for example, in a range of 1 ppq by mass to 5,000 ppm by mass.

The aqueous cleaning liquid according to the present embodiment may contain, for example, objects to be counted which have such a size that can be counted by a light scattering type in-liquid particle counter. The size of the object to be counted is, for example, 0.04 μm or more. The number of objects to be counted in the aqueous cleaning liquid according to the present embodiment is, for example, 1,000 or less per mL of the aqueous cleaning liquid, and the lower limit value thereof is, for example, 1 or more. It is conceived that in a case where the number of objects to be counted in the aqueous cleaning liquid is in the above-described range, the metal corrosion suppressing effect of the aqueous cleaning liquid is improved.

The size of the objects to be counted may be a size that can be detected by a light scattering type in-liquid particle counter, and it may be, for example, 0.001 μm or more.

The organic impurities and/or the objects to be counted may be added to the cleaning liquid or may be inevitably mixed into the cleaning liquid in a step of producing the aqueous cleaning liquid. Examples of the case where organic impurities and/or the objects to be counted are inevitably mixed in a step of producing the aqueous cleaning liquid include a case where organic impurities are contained in a raw material (for example, an organic solvent) that is used for the production of the aqueous cleaning liquid contain, and a case where organic impurities are mixed (for example, contamination) from the external environment in a step of producing the aqueous cleaning liquid, which are not limited thereto.

In a case where the objects to be counted are added to the aqueous cleaning liquid, the abundance ratio thereof may be adjusted for each specific size in consideration of the surface roughness and the like of the cleaning target.

<Storage Container>

A method for storing the chemical liquid of the present embodiment is not particularly limited, and storage containers known in the related art can be used. In order to ensure the stability of the chemical liquid, a void ratio in a container in a case of storing the chemical liquid in the container and/or a type of gas filling the voids may be appropriately set. For example, the void ratio in the storage container may be approximately in a range of 0.01% to 30% by volume.

In a case of using the chemical liquid according to the present embodiment, the chemical liquid may be diluted in a range of 2 to 2,000 times to obtain a diluted liquid, and then a substrate may be treated using the diluted liquid. The chemical liquid can be diluted with, for example, water.

The content of each component contained in the chemical liquid according to the present embodiment may be a measured value measured by a measuring device. As the measuring device, a known device can be appropriately selected depending on the kind of the component.

In a case where the content of the target component is lower than the detection limit, the chemical liquid may be subjected to measurement after being appropriately concentrated.

Each component contained in the chemical liquid according to the present embodiment may be appropriately purified before being blended into the chemical liquid.

As the purification method, a known method can be used depending on the kind of the component.

<pH>

The pH of the aqueous cleaning liquid according to the present embodiment is more than 5, and it is preferably in a range of more than 5 to 7, more preferably in a range of 5.1 to 6.5, and still more preferably in a range of 5.1 to 6.0.

In a case where the aqueous cleaning liquid according to the present embodiment contains a benzenecarboxylic acid compound as a water-soluble aromatic compound, the pH thereof is preferably in a range of 5.2 to 7, more preferably in a range of 5.3 to 6.5, and still more preferably in a range of 5.3 to 6.0.

In a case where the aqueous cleaning liquid according to the present embodiment contains a phenylphosphonic acid compound as a water-soluble aromatic compound, the pH thereof is preferably in a range of more than 5 to 7, more preferably in a range of 5.1 to 6.5, and still more preferably in a range of 5.1 to 6.0.

Since the aqueous cleaning liquid according to the present embodiment contains hydrofluoric acid as an acid component, the cleanability is favorable. In general, a cleaning liquid containing hydrofluoric acid has excellent cleanability; however, the anticorrosion properties thereof are likely to be deteriorated.

The aqueous cleaning liquid according to the embodiment further contains a water-soluble aromatic compound. As a result of studies, the inventors of the present invention found that in a case of adding a water-soluble aromatic compound to an aqueous cleaning liquid containing hydrofluoric acid, it is possible to improve the anticorrosion properties while maintaining the cleanability.

(Cleaning Method for Electronic Device)

A cleaning method for an electronic device according to the present embodiment includes a step of bringing the aqueous cleaning liquid into contact with an electronic device.

Typically, dry etching residues can be removed by bringing the aqueous cleaning liquid into contact with an electronic device (for example, a semiconductor element) in a wet etching step (or steps before and after the wet etching step).

As a contact method, for example, the aqueous cleaning liquid is accommodated in a cleaning container, an electronic device to be cleaned is immersed in the aqueous cleaning liquid, whereby dry etching residues can be removed, and the electronic device can be cleaned. Alternatively, an electronic device is treated according to a sheet type cleaning method, whereby dry etching residues can be removed, and the electronic device can be cleaned. The aqueous cleaning liquid is suitably used as an etchant as well as a dry etching residue removing liquid (cleaning liquid). In addition, the aqueous cleaning liquid can also be used as a cleaning liquid for cleaning an electronic device after a chemical-mechanical polishing (CMP) step.

The temperature at which the aqueous cleaning liquid is used is typically in a range of 10° ° C. to 80° C., preferably in a range of 15° C. to 70° C., more preferably in a range of 20° ° C. to 65° C., and particularly preferably in a range of 20° C. to 60° ° C. The temperature can be appropriately selected depending on the cleaning conditions and the electronic device (for example, a semiconductor element) to be used.

The time during which the aqueous cleaning liquid is used is typically in a range of 0.2 to 60 minutes. The time can be appropriately selected depending on the cleaning conditions and the electronic device (for example, a semiconductor element) to be used. As a rinsing liquid that is used after using the aqueous cleaning liquid, an organic solvent, water, carbonated water, or ammonia water can be used.

Examples of the electronic device serving as a cleaning target and a production target, which can be suitably used in the present embodiment, include a semiconductor element and a display element. In general, an intermediate product after the dry etching step is used as a cleaning target. Examples of the semiconductor element and the display element include substrate materials such as silicon, amorphous silicon, polysilicon, glass, and TiN, insulating materials such as silicon oxide, silicon nitride, silicon carbide, and derivatives thereof, materials such as cobalt, a cobalt alloy, copper, a copper alloy, tungsten, and titanium-tungsten, compound semiconductors such as gallium-arsenic, gallium-phosphorus, indium-phosphorus, indium-gallium-arsenic, and indium-aluminum-arsenic, and oxide semiconductors such as chromium oxide. The electronic device as a cleaning target in the present embodiment is preferably a cobalt or cobalt alloy wiring material, a copper or copper alloy wiring material, a tungsten-containing material, or a TiN substrate after a dry etching treatment using a fluorine-based gas.

Examples

Hereinafter, the present invention will be described in more detail based on Examples; however, the present invention is not limited to these Examples.

<Preparation (1) of Aqueous Cleaning Liquid>

Each component listed in Table 1 was mixed, and acetic acid and ammonium hydroxide were blended to have the pH shown in Table 1, thereby preparing an aqueous cleaning liquid of each example.

TABLE 1

| | Etchant | Water-soluble aromatic compound | Water | pH | Anticorrosion performance Cu | Anticorrosion performance Co |
|---|---|---|---|---|---|---|
| Comparative Example 1 | Hydrofluoric acid [0.2] | — | Residual part | 3.0 | Control | Control |
| Comparative Example 2 | Hydrofluoric acid [0.2] | — | Residual part | 4.0 | Control | Control |
| Comparative Example 3 | Hydrofluoric acid [0.2] | — | Residual part | 5.0 | Control | Control |
| Comparative Example 4 | Hydrofluoric acid [0.2] | — | Residual part | 6.0 | Control | Control |
| Comparative Example 5 | Hydrofluoric acid [0.2] | — | Residual part | 7.0 | Control | Control |
| Comparative Example 6 | Hydrofluoric acid [0.2] | Phthalic acid [0.3] | Residual part | 3.0 | 1.53 | 1.51 |
| Comparative Example 7 | Hydrofluoric acid [0.2] | Phthalic acid [0.3] | Residual part | 4.0 | 1.54 | 1.66 |
| Comparative Example 8 | Hydrofluoric acid [0.2] | Phthalic acid [0.3] | Residual part | 5.0 | 1.33 | 1.66 |
| Example 1 | Hydrofluorid acid [0.2] | Phthalic acid [0.3] | Residual part | 6.0 | 1.64 | 1.68 |
| Example 2 | Hydrofluoric acid [0.2] | Phthalic acid [0.3] | Residual part | 7.0 | 2.57 | 1.43 |
| Example 3 | Hydrofluoric acid [0.2] | PhPA [0.1] | Residual part | 6.0 | 1.24 | 1.09 |
| Example 4 | Hydrofluoric acid [0.2] | PhPA [0.2] | Residual part | 6.0 | 1.89 | 1.31 |
| Comparative Example 9 | Hydrofluoric acid [0.2] | PhPA [0.3] | Residual part | 3.0 | 1.90 | 1.11 |
| Comparative Example 10 | Hydrofluoric acid [0.2] | PhPA [0.3] | Residual part | 4.0 | 1.57 | 1.11 |
| Comparative Example 11 | Hydrofluoric acid [0.2] | PhPA [0.3] | Residual part | 5.0 | 1.36 | 1.20 |
| Example 5 | Hydrofluoric acid [0.2] | PhPA [0.3] | Residual part | 6.0 | 2.17 | 1.38 |

TABLE 1-continued

| | Etchant | Water-soluble aromatic compound | Water | pH | Anticorrosion performance Cu | Co |
|---|---|---|---|---|---|---|
| Example 6 | Hydrofluoric acid [0.2] | PhPA [0.3] | Residual part | 7.0 | 2.49 | 1.78 |

In Table 1, each abbreviation has the following meaning. The numerical values in [ ] indicate blending amounts (in terms of parts by mass).

PhPA: phenylphosphonic acid

<Evaluation (1) of Anticorrosion Performance>

A model film (a film of each of Co and Cu) consisting of each material described in Table 1 was prepared, and the etchability was evaluated based on the etching rate thereof. The film thickness of each model film is a film thickness of 1,000 Å. Each model film was subjected to an etching treatment by using a treatment liquid of each of Examples and Comparative Examples. Specifically, each model film was immersed in the aqueous cleaning liquid (25° C.) of each of Examples and Comparative Examples for 5 minutes, and then the etching rate was calculated based on the difference in the film thickness of the model film before and after the immersion in the treatment liquid.

It is noted that the film thicknesses of the model film before and after the treatment were measured by a fluorescent X-ray analysis method using ZSX Primus IV (manufactured by RIGAKU Corporation).

The anticorrosion performance of the aqueous cleaning liquid of each of Comparative Examples 6 to 11 and Examples 1 to 6 was calculated according to the following expression by using the aqueous cleaning liquid of each of Comparative Examples 1 to 5 as a control. It is noted that the evaluation was carried out under the condition that the pH of the control aqueous cleaning liquid and the pH of the measurement target aqueous cleaning liquid had the same value. The results are shown in Table 1.

$$\text{(Anticorrosion performance)} = \left(\text{etching rate of control aqueous cleaning liquid } (\text{Å/min})\right) / \left(\text{etching rate of aqueous cleaning liquid to be evaluated } (\text{Å/min})\right)$$

From the results shown in Table 1, it was confirmed that the aqueous cleaning liquids of Examples 1 to 6 have favorable metal anticorrosion properties.

<Preparation (2) of Aqueous Cleaning Liquid>

Each component listed in Table 2 was mixed, and acetic acid and ammonium hydroxide were blended to have the pH shown in Table 2, thereby preparing an aqueous cleaning liquid of each example.

TABLE 2

| | Etchant | Water-soluble aromatic compound | | Water | pH | Anticorrosion performance Cu | Co |
|---|---|---|---|---|---|---|---|
| Comparative Example 4 | Hydrofluoric acid [0.2] | — | — | Residual part | 6.0 | Control | Control |
| Example 5 | Hydrofluoric acid [0.2] | PhPA [0.3] | — | Residual part | 6.0 | 1.50 | 1.27 |
| Example 7 | Hydrofluoric acid [0.2] | PhPA [0.3] | DiPhPiA [0.001] | Residual part | 6.0 | 2.17 | 1.38 |
| Example 8 | Hydrofluoric acid [0.2] | PhPA [0.3] | DiPhPiA [0.004] | Residual part | 6.0 | 3.41 | 1.50 |

In Table 2, each abbreviation has the following meaning. The numerical values in [ ] indicate blending amounts (in terms of parts by mass).

PhPA: phenylphosphonic acid

DiPhPiA: diphenylphosphinic acid

<Evaluation (2) of Anticorrosion Performance>

The anticorrosion performance was evaluated in the same manner as in "Evaluation of anticorrosion performance (1)", except that the aqueous cleaning liquid of Comparative Example 4 was used as a control. The results are shown in Table 2.

From the results shown in Table 2, it was confirmed that the aqueous cleaning liquids of Examples 7 and 8 have metal anticorrosion properties much more favorable than those of the aqueous cleaning liquids of Example 5.

<Preparation (3) of Aqueous Cleaning Liquid>

Each component listed in Table 3 was mixed, and acetic acid and ammonium hydroxide were blended to have the pH shown in Table 3, thereby preparing an aqueous cleaning liquid of each example.

TABLE 3

| | Etchant | Water-soluble aromatic compound | | Water | pH | Cleaning performance |
|---|---|---|---|---|---|---|
| Comparative Example 4 | Hydrofluoric acid [0.2] | — | — | Residual part | 6.0 | Control |
| Comparative Example 8 | Hydrofluoric acid [0.2] | Phthalic acid [0.3] | — | Residual part | 5.0 | B |
| Example 9 | Hydrofluoric acid [0.2] | Phthalic acid [0.3] | — | Residual part | 5.1 | B |
| Example 10 | Hydrofluoric acid [0.2] | Phthalic acid [0.3] | — | Residual part | 5.3 | A |
| Example 11 | Hydrofluoric acid [0.2] | Phthalic acid [0.3] | — | Residual part | 5.5 | A |
| Example 12 | Hydrofluoric acid [0.2] | Phthalic acid [0.3] | — | Residual part | 5.7 | A |
| Example 13 | Hydrofluoric acid [0.2] | Phthalic acid [0.3] | — | Residual part | 5.9 | A |
| Example 1 | Hydrofluoric acid [0.2] | Phthalic acid [0.3] | — | Residual part | 6.0 | A |
| Example 14 | Hydrofluoric acid [0.2] | PhPA [0.3] | — | Residual part | 5.1 | A |
| Example 15 | Hydrofluoric acid [0.2] | PhPA [0.3] | — | Residual part | 5.3 | A |
| Example 16 | Hydrofluoric acid [0.2] | PhPA [0.3] | — | Residual part | 5.5 | A |
| Example 17 | Hydrofluoric acid [0.2] | PhPA [0.3] | — | Residual part | 5.7 | A |
| Example 18 | Hydrofluoric acid [0.2] | PhPA [0.3] | — | Residual part | 5.9 | A |
| Example 5 | Hydrofluoric acid [0.2] | PhPA [0.3] | — | Residual part | 6.0 | A |
| Example 7 | Hydrofluoric acid [0.2] | PhPA [0.3] | DiPhPiA [0.001] | Residual part | 6.0 | A |
| Example 8 | Hydrofluoric acid [0.2] | PhPA [0.3] | DiPhPiA [0.004] | Residual part | 6.0 | A |

In Table 3, each abbreviation has the following meaning. The numerical values in [ ] indicate blending amounts (in terms of parts by mass).

PhPA: phenylphosphonic acid

DiPhPiA: diphenylphosphinic acid

<Evaluation of Cleanability>

A TiN substrate (1) after a dry etching treatment using a fluorine-based gas was used to carry out an evaluation.

The aqueous cleaning liquid of each example was placed in a beaker, and the TiN substrate (1) was immersed in the aqueous cleaning liquid of each example at 25° C. for 5 minutes, thereby being subjected to a cleaning treatment. After the cleaning treatment, the TiN substrate (1) was rinsed with ultrapure water (25° C.) for 3 seconds, subsequently cleaned with isopropyl alcohol (25° C.) for 30 lines, and dried by nitrogen blowing. Regarding the dried TiN substrate (1), the film thickness of the TiN substrate was measured by X-ray photoelectron spectroscopy (XPS) using K-ALPHA+(manufactured by Thermo Fisher Scientific, Inc.). The etching rate (nm/min) with respect to the Ti residue was calculated from the film thicknesses of the TiN substrate (1) before and after the cleaning treatment.

The cleanability was evaluated according to the following standard by using the aqueous cleaning liquid of Comparative Example 4 as a control. The results are shown in Table 3.

A: The cleanability (the etching rate with respect to the Ti residue) is equal to or higher than that of the control.

B: The cleanability (the etching rate with respect to the Ti residue) is reduced as compared with that of the control.

From the results shown in Table 3, it was confirmed that the aqueous cleaning liquids of Examples 1, 5, 7, 8, and 10 to 18 exhibit the cleanability equal to or higher than that of the aqueous cleaning liquid of Comparative Example 4.

The preferred examples of the present invention have been described as above; however, the present invention is not limited to these Examples. Additions, omissions, substitutions, and other modifications of the configuration can be made without departing from the spirit of the present invention. The present invention is not limited by the description described above and is limited only by the scope of the attached Claims.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. An aqueous cleaning liquid consisting of:

hydrofluoric acid;

a phthalic acid compound;

at least one organic acid selected from the group consisting of an aliphatic carboxylic acid having 1 to 18 carbon atoms, an aromatic carboxylic acid having 6 to 10 carbon atoms, and an amino acid having 1 to 10 carbon atoms;

at least one pH adjusting agent selected from the group consisting of ammonium hydroxide, lithium hydroxide, sodium hydroxide, potassium hydroxide, rubidium hydroxide, cesium hydroxide, tetramethylammonium hydroxide, bis(2-hydroxyethyl)dimethylammonium hydroxide, tetraethylammonium hydroxide, tetrapropylammonium hydroxide, tetrabutylammonium hydroxide, methyltriethylammonium hydroxide, trimethyl(hydroxyethyl) ammonium hydroxide, and triethyl (hydroxyethyl) ammonium hydroxide; and balance water, wherein the aqueous cleaning liquid has a pH of more than 5.3 to 7.

2. The aqueous cleaning liquid according to claim 1, wherein 1% by mass or less of the phthalic acid compound is contained with respect to a total amount of the aqueous cleaning liquid.

3. The aqueous cleaning liquid according to claim 1, wherein 50 ppm or more and 3,000 ppm or less of the hydrofluoric acid is contained with respect to a total amount of the aqueous cleaning liquid.

4. The aqueous cleaning liquid according to claim 1, wherein the aqueous cleaning liquid has a pH in a range of more than 5.3 to 6.0.

5. An aqueous cleaning liquid consisting of:

hydrofluoric acid;

a phenylphosphonic acid compound;

at least one organic acid selected from the group consisting of an aliphatic carboxylic acid having 1 to 18 carbon atoms, an aromatic carboxylic acid having 6 to 10 carbon atoms, and an amino acid having 1 to 10 carbon atoms;

at least one pH adjusting agent selected from the group consisting of ammonium hydroxide, lithium hydroxide, sodium hydroxide, potassium hydroxide, rubidium hydroxide, cesium hydroxide, tetramethylammonium hydroxide, bis(2-hydroxyethyl)dimethylammonium hydroxide, tetraethylammonium hydroxide, tetrapropylammonium hydroxide, tetrabutylammonium hydroxide, methyltriethylammonium hydroxide, trimethyl(hydroxyethyl) ammonium hydroxide, and triethyl (hydroxyethyl) ammonium hydroxide; and, balance water, wherein the aqueous cleaning liquid has a pH of more than 5.3.

6. The aqueous cleaning liquid according to claim 5, wherein 1% by mass or less of the phenylphosphonic acid compound is contained with respect to a total amount of the aqueous cleaning liquid.

7. The aqueous cleaning liquid according to claim 5, wherein 50 ppm or more and 3,000 ppm or less of the hydrofluoric acid is contained with respect to a total amount of the aqueous cleaning liquid.

8. The aqueous cleaning liquid according to claim 5, wherein the aqueous cleaning liquid has a pH in a range of 5.3 to 6.0.

* * * * *